United States Patent
Cuevas et al.

(10) Patent No.: US 10,254,432 B2
(45) Date of Patent: Apr. 9, 2019

(54) MULTI-ELECTRODE ELECTRIC FIELD DOWNHOLE LOGGING TOOL

(71) Applicant: Schlumberger Technology Corporation, Sugar Land, TX (US)

(72) Inventors: Nestor H. Cuevas, Milan (IT); Herve Denaclara, Houston, TX (US); Tomohito Yamazaki, Sugar Land, TX (US); James Minto, Houston, TX (US); Ryosei Aoki, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 278 days.

(21) Appl. No.: 14/748,839

(22) Filed: Jun. 24, 2015

(65) Prior Publication Data
US 2015/0369949 A1    Dec. 24, 2015

Related U.S. Application Data

(60) Provisional application No. 62/016,426, filed on Jun. 24, 2014.

(51) Int. Cl.
*G01V 3/26* (2006.01)
*G01V 3/34* (2006.01)

(52) U.S. Cl.
CPC . *G01V 3/26* (2013.01); *G01V 3/34* (2013.01)

(58) Field of Classification Search
CPC .............. G01V 3/30; G01V 3/26; G01V 3/34
USPC ....................................................... 324/338
See application file for complete search history.

(56) References Cited

U.S. PATENT DOCUMENTS

| | | | |
|---|---|---|---|
| 4,875,015 A | 10/1989 | Ward | |
| 5,159,978 A | 11/1992 | Tomek et al. | |
| 5,680,049 A * | 10/1997 | Gissler | E21B 17/1021 324/368 |
| 6,088,655 A | 11/2000 | Daily et al. | |
| 6,657,597 B2 | 12/2003 | Rodney | |
| RE40,321 E * | 5/2008 | Srnka | G01V 3/12 324/354 |
| 2002/0057210 A1 | 5/2002 | Frey et al. | |
| 2006/0028208 A1 | 2/2006 | Strack et al. | |
| 2006/0238200 A1 | 10/2006 | Johnstad | |
| 2010/0026305 A1 | 2/2010 | Yanzig | |
| 2011/0042075 A1 | 2/2011 | Hammami et al. | |
| 2011/0308789 A1 | 12/2011 | Zhang et al. | |
| 2013/0241561 A1 | 9/2013 | Allen | |

OTHER PUBLICATIONS

International Search Report and Written Opinion issued in related PCT application PCT/US2015/037408 dated Sep. 16, 2015, 11 pages.
Wilt et al., "Crosswell electromagnetic tomography: System design considerations and field results", Geophysics, vol. 60, No. 3, May-Jun. 1995, pp. 871-885.
(Continued)

*Primary Examiner* — Reena Aurora
(74) *Attorney, Agent, or Firm* — Michael Dae

(57) ABSTRACT

A device can include a housing; external electrodes; circuitry disposed in the housing where the circuitry converts analog signals sensed by the external electrodes to digital signals. Various other apparatuses, systems, methods, etc., are also disclosed.

8 Claims, 10 Drawing Sheets

(56) References Cited

OTHER PUBLICATIONS

Bing et al., "Cross-hole resistivity tomography using different electrode configurations", Geophysical Prospecting, vol. 48, 2000, pp. 887-912.
Daily et al., "Electrical resistance tomography—Theory and practice", In: Butler D. K. (ed.) Near surface geophysics: SEG Investigations in Geophysics Series No. 13, 2005, pp. 525-550.
Nimmer et al., "Three-dimensional effects causing artifacts in two dimensional, cross-borehole, electrical imaging", Journal of Hydrology, vol. 359, 2008, pp. 59-70.
Osiensky et al., "Borehole cylindrical noise during hole-surface and hole-hole resistivity measurements", Journal of Hydrology, vol. 289, 2004, pp. 78-94.

* cited by examiner

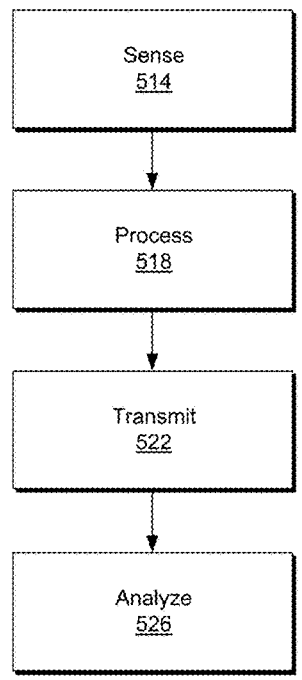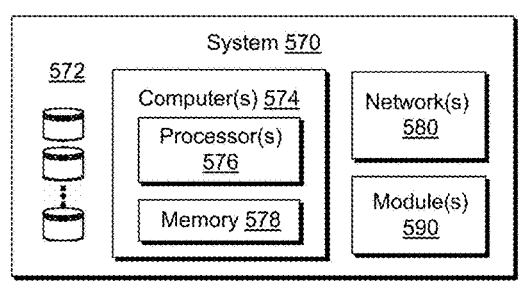
Fig. 5

Flg. 7

MULTI-ELECTRODE ELECTRIC FIELD DOWNHOLE LOGGING TOOL

BACKGROUND

Electrical resistivity tomography (ERT) is a technique that involves making electrical resistivity measurements that can provide insights as to sub-surface structures. As an example, ERT may be implemented using electrodes of a tool that can be disposed in a borehole. An inversion of measured information may be performed, for example, as used in the field of tomography. As an example, resources may exist in subterranean fields that span large geographic areas. For example, hydrocarbons may exist in a basin that may be a depression in the crust of the Earth caused by plate tectonic activity and subsidence, in which sediments accumulate (e.g., to form a sedimentary basin). Various technologies, techniques, etc. described herein may facilitate assessment of a sub-surface structures and, for example, development of a basin for production of one or more types of resources.

SUMMARY

A device can include a housing; external electrodes; circuitry disposed in the housing where the circuitry converts analog signals sensed by the external electrodes to digital signals. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 5 illustrates an example of a method and an example of a system;

DETAILED DESCRIPTION

Figure 1:
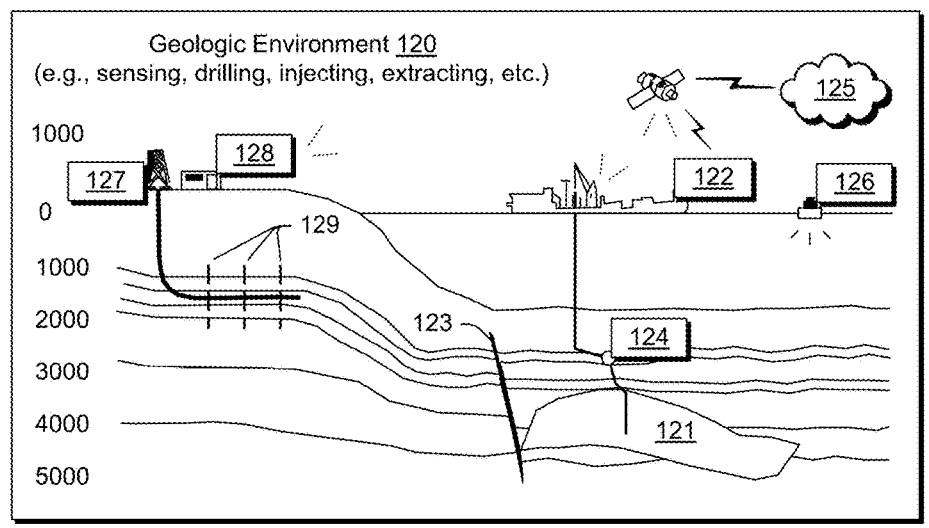
FIG. 1 illustrates examples of equipment in a geologic environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Low frequency electromagnetic (EM) measurements in geophysical surveys may be performed using one or more inductive devices to sense magnetic fields and capacitive or galvanic coupled electrodes to acquire electrical potential at the position of single electrodes. As an example, a measurement of electric field may be determined by a difference of potential between two nearby electrodes. A device configured to make EM measurements may be configured for positioning in a borehole, for example, to be substantially disposed along or parallel to an axis of a borehole. As an example, magnetic field measurements may be made as part of a cross well EM survey, for example, using induction coils while electric field measurements may be made using electrical resistivity tomography (ERT), for example, via take outs from a multi conductor cable connected to metal electrodes that galvanically couple to a medium (e.g., or media).

In making ERT measurements, a system can include sensing potential differences for a range of depth in a borehole where corresponding analog signals are transmitted to surface equipment for digitization and recording (e.g., via a surface data logger). Such an approach tends to be acceptable at shallow depths; however, analog signal degradation and noise can occur, especially with increasing cable length as measurement depth deepens.

As an example, a multi-electrode logging tool may be deployed at depth by a wireline system. In such an example, measurement of electric field can be performed by differentiation of electric potential, for example, as associated with two electrodes. Such a tool may include circuitry that can precondition and/or digitize analog signals, for example, while the tool is positioned in a borehole. Where transmission of information is desired, the tool may transmit digitized information (e.g., digital data) to other equipment, which may be surface equipment. As an example, a tool may include an interface for transmission of digital data. In such an example, the interface may be coupled to a cable or cables. Such a cable or cables may be operatively coupled to equipment that may be located at a surface, for example, proximate to an opening of a borehole. As an example, consider a system that is configured to precondition and digitize analog signals at depth and then transmit digital signals (e.g., digital data) to surface equipment using wireline electronics. In such an example, downhole analog signal processing that generates digital data can reduce degradation of information as may be associated with transmission of analog signals over a substantial length of cable. As an example, digital data signals may be more immune to noise when compared to analog signals transmitted over a substantial length of cable in a downhole environment. Thus, an approach may act to reduce signal degradation and impact of noise on information acquired in a downhole environment.

As an example, a device can include a plurality of sensing electrodes, which may be, for example, capacitive or galvanic coupled. Such a device can be operatively coupled to circuitry for signal conditioning of its analog output, which may be one or more of capacitively sensed analog signals, galvanically sensed analog signals or analog signals of a magnetic field sensor.

The measurement of the electric fields can involve differentiation of potential of electrodes, which may be electrode pairs, for example, optionally neighboring electrodes. As an example, a device, a system, a method, etc. may account for distorting effects due to one or more of a cased or open completion of a well, electrical properties of borehole fluid, electrical properties of a logging tool holding sensors, and electrodes themselves. For example, conductivity of borehole fluid can affect coupling to a medium (e.g., or media) when using galvanic coupled electrodes. As another example, consider oil based mud fluid yielding a higher contact resistance and thereby higher noise in the measurement; whereas, water based mud provides a lower contact resistance but strong low frequency noise can be observed due to self-potential, streaming potential and battery effects, which can be at fluid metal interfaces, as well as at the junctions between dissimilar metals in a logging tool.

As to the electrical properties of a logging tool, such properties can distort an electric field observed in the vicinity of the logging tool. In particular metallic housings can yield a vanishing field in the axial direction and maximum in the orthogonal direction and thereby a strong distortion can exist in the vicinity of such housings, as well as in the vicinity of junctions between metallic and insulating sections of the logging tools.

As an example, a data logger system can be implemented for making multiple electric field measurements where such measurements may be, for example, based at least in part on differentiation of potentials acquired at electrode positions of a downhole tool of the data logger system where the electrode positions may be contiguous positions. As an example, a tool may be configured with an aim to maximize contact between its electrodes and a borehole wall of a formation. For example, a tool can include one or more vertical insulating eccentralizers that act to push the tool to be in contact with the formation. As an example, an eccentralizer may exert a biasing force (e.g., or biasing forces) that biases one or more electrodes toward a borehole wall of a formation.

As an example, an electrode holder, which may be a logging tool, a separate rod hanging below or above a tool, or a wireline cable, can be electrically insulated from a medium or media in a borehole. For example, a logging tool can be covered by an electrically insulating sleeve (e.g., along a length, optionally from top to bottom) that acts to reduce risk of contact (e.g., to prevent contact) between a borehole medium (e.g., or borehole media) and one or more metallic sections of the tool. As an example, an insulating bridal may be used at a head of a tool array.

As an example, electrode size and material can be selected and configured in a manner that acts to minimize streaming potential and self-potential at interfaces between an electrode and borehole medium (e.g., or borehole media).

As an example, a system can include an analog signal generator that can be used to feed analog signals into one or more tools, for example, via one or more insulating cables that can connect to electronic housings through insulating sleeves. As an example, analog signals can be preconditioned and digitized in electronics downhole (e.g., via electronics of a downhole tool). In such an example, data may be submitted digitally to one or more other pieces of equipment (e.g., consider surface equipment) via one or more wireline cables. As an example, a downhole tool may be a tool that is configured for downhole positioning and use. Thus, a downhole tool may be a tool that is not downhole. The phrase "downhole" with respect to equipment may be appreciated in context to refer to equipment that is configured for downhole positioning and use and/or such equipment that is positioned downhole (e.g., in a borehole, etc.). As an example, equipment may be implemented as part of a data acquisition system for surface to borehole and/or borehole to surface services.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

Geologic formations such as in, for example, the geologic environment 120, include rock, which may be characterized by, for example, porosity values and by permeability values. Porosity may be defined as a percentage of volume occupied by pores, void space, volume within rock that can include fluid, etc. Permeability may be defined as an ability to transmit fluid, measurement of an ability to transmit fluid, etc.

As an example, rock may include clastic material, carbonate material and/or other type of material. As an example, clastic material may be material that includes broken fragments derived from preexisting rocks and transported elsewhere and redeposited before forming another rock. Examples of clastic sedimentary rocks include siliciclastic rocks such as conglomerate, sandstone, siltstone and shale. As an example, carbonate material may include calcite ($CaCo_3$), aragonite ($CaCO_3$) and/or dolomite ($CaMg(CO_3)_2$), which may replace calcite during a process known as dolomitization. Limestone, dolostone or dolomite, and chalk are some examples of carbonate rocks. As an example, carbonate material may be of clastic origin. As an example, carbonate material may be formed through processes of precipitation or the activity of organisms (e.g., coral, algae, etc.). Carbonates may form in shallow and deep marine settings, evaporitic basins, lakes, windy deserts, etc. Carbonate material deposits may serve as hydrocarbon reservoir rocks, for example, where porosity may have been enhanced through dissolution. Fractures can increase permeability in carbonate material deposits.

The term "effective porosity" may refer to interconnected pore volume in rock, for example, that may contribute to fluid flow in a formation. As effective porosity aims to exclude isolated pores, effective porosity may be less than total porosity. As an example, a shale formation may have relatively high total porosity yet relatively low permeability due to how shale is structured within the formation.

As an example, shale may be formed by consolidation of clay- and silt-sized particles into thin, relatively impermeable layers. In such an example, the layers may be laterally extensive and form caprock. Caprock may be defined as relatively impermeable rock that forms a barrier or seal with respect to reservoir rock such that fluid does not readily migrate beyond the reservoir rock. As an example, the permeability of caprock capable of retaining fluids through geologic time may be of the order of about $10^{-6}$ to about $10^{-8}$ D (darcies).

The term "shale" may refer to one or more types of shales that may be characterized, for example, based on lithology, etc. In shale gas formations, gas storage and flow may be related to combinations of different geophysical processes. For example, regarding storage, natural gas may be stored as compressed gas in pores and fractures, as adsorbed gas (e.g., adsorbed onto organic matter), and as soluble gas in solid organic materials.

Gas migration and production processes in gas shale sediments can occur, for example, at different physical scales. As an example, production in a newly drilled wellbore may be via large pores through a fracture network and then later in time via smaller pores. As an example, during reservoir depletion, thermodynamic equilibrium among kerogen, clay and the gas phase in pores can change, for example, where gas begins to desorb from kerogen exposed to a pore network.

Sedimentary organic matter tends to have a high sorption capacity for hydrocarbons (e.g., adsorption and absorption processes). Such capacity may depend on factors such as, for example, organic matter type, thermal maturity (e.g., high maturity may improve retention) and organic matter chemical composition. As an example, a model may characterize a formation such that a higher total organic content corresponds to a higher sorption capacity.

With respect to a formation that includes hydrocarbons (e.g., a hydrocarbon reservoir), its hydrocarbon producing potential may depend on various factors such as, for example, thickness and extent, organic content, thermal maturity, depth and pressure, fluid saturations, permeability, etc. As an example, a formation that includes gas (e.g., a gas reservoir) may include nanodarcy matrix permeability (e.g., of the order of $10^{-9}$ D) and narrow, calcite-sealed natural fractures. In such an example, technologies such as stimulation treatment may be applied in an effort to produce gas from the formation, for example, to create new, artificial fractures, to stimulate existing natural fractures (e.g., reactivate calcite-sealed natural fractures), etc. (see, e.g., the one or more fractures 129 in the geologic environment 120 of FIG. 1).

Material in a geologic environment may vary by, for example, one or more of mineralogical characteristics, formation grain sizes, organic contents, rock fissility, etc. Attention to such factors may aid in designing an appropriate stimulation treatment and/or one or more other field operations. For example, an evaluation process may include well construction (e.g., drilling one or more vertical, horizontal or deviated wells), sample analysis (e.g., for geomechanical and geochemical properties), open-hole logs (e.g., petrophysical log models) and post-fracture evaluation (e.g., production logs). Effectiveness of a stimulation treatment (e.g., treatments, stages of treatments, etc.), may determine flow mechanism(s), well performance results, etc.

As an example, a stimulation treatment may include pumping fluid into a formation via a wellbore at pressure and rate sufficient to cause a fracture to open. Such a fracture may be vertical and include wings that extend away from the wellbore, for example, in opposing directions according to natural stresses within the formation. As an example, proppant (e.g., sand, etc.) may be mixed with treatment fluid to deposit the proppant in the generated fractures in an effort to maintain fracture width over at least a portion of a generated fracture. For example, a generated fracture may have a length of about 500 ft extending from a wellbore where proppant maintains a desirable fracture width over about the first 250 ft of the generated fracture.

In a stimulated gas formation, fracturing may be applied over a region deemed a "drainage area" (e.g., consider at least one well with at least one artificial fracture), for example, according to a development plan. In such a formation, gas pressure (e.g., within the formation's "matrix") may be higher than in generated fractures of the drainage area such that gas flows from the matrix to the generated fractures and onto a wellbore. During production of the gas, gas pressure in a drainage area tends to decrease (e.g., decreasing the driving force for fluid flow, for example, per Darcy's law, Navier-Stokes equations, etc.). As an example, gas production from a drainage area may continue for decades; however, the predictability of decades long production (e.g., a production forecast) can depend on many factors, some of which may be uncertain (e.g., unknown, unknowable, estimated with probability bounds, etc.).

As an example, a method may include measurement of electrical resistivity of material in a geologic environment. Electrical resistivity relates to the ability of a material to resist or inhibit flow of electrical current (e.g., measured in ohm-meters). Resistivity is the reciprocal of conductivity.

The electrical resistivity of rock is a property that can depend on characteristics such as lithology and fluid content. For example, resistivity of coarse-grained, well-consolidated sandstone saturated with fresh water is higher than that of unconsolidated silt of the same porosity, saturated with the water of similar properties. As an example, resistivities of porous rock samples can vary according to salinity of the saturating water. For example, a higher salinity of water in rock tends to result in a lower resistivity of the rock. An analysis of electrical resistivity may include use of so-called Archie's law or Archie equation, for example, depending on conductivity of rock and fluid in the spaces within the rock. As another example, consider the Simandoux model for electrical resistivity:

$$R = (F^{-1} \cdot \sigma_w + V_{sh} \cdot \sigma_{shale})^{-1}.$$

where:

$\sigma_w$, water conductivity $\sigma_{sh}$, shale conductivity

F, Formation factor that is function of $S_w$/(water saturation), porosity, m and n empirical coefficients, $F = f(S_w, \phi, m, n)$.

$V_{sh}$, shale mineral fraction.

Various models exist for electrical resistivity, the Archie equation and Simandoux model being two examples, noting that other models may be implemented.

Figure 2:
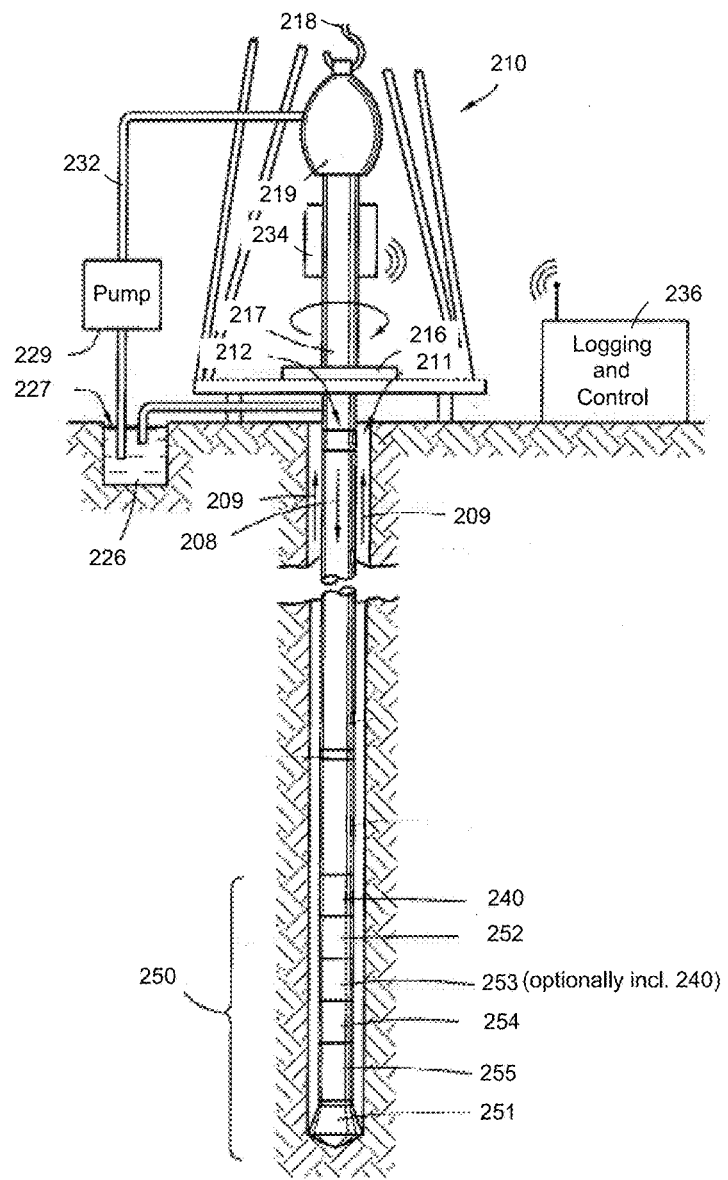
FIG. 2 illustrates an example of equipment.

FIG. 2 shows a wellsite system (e.g., at a wellsite that may be onshore or offshore). In the example system of FIG. 2, a borehole 211 is formed in subsurface formations by rotary drilling; noting that various example embodiments may also use directional drilling. As shown, a drill string 212 is suspended within the borehole 211 and has a bottom hole assembly 250 that includes a drill bit 251 at its lower end. A surface system provides for operation of the drill string 212 and other operations and includes platform and derrick assembly 210 positioned over the borehole 211, the assembly 210 including a rotary table 216, a kelly 217, a hook 218 and a rotary swivel 219. As indicated by an arrow, the drill string 212 can be rotated by the rotary table 216, energized by means not shown, which engages the kelly 217 at the upper end of the drill string 212. The drill string 212 is suspended from a hook 218, attached to a traveling block (not shown), through the kelly 217 and a rotary swivel 219 which permits rotation of the drill string 212 relative to the hook 218. As an example, a top drive system may be suitably used.

In the example of this embodiment, the surface system further includes drilling fluid (e.g., mud, etc.) 226 stored in a pit 227 formed at the wellsite. As an example, a wellbore may be drilled to produce fluid, inject fluid or both (e.g., hydrocarbons, minerals, water, etc.). In the example of FIG. 2, the drill string 212 (e.g., including one or more downhole tools) may be composed of a series of pipes threadably connected together to form a long tube with the drill bit 251 at the lower end thereof. As the drill tool 212 is advanced into a wellbore for drilling, at some point in time prior to or coincident with drilling, the drilling fluid 226 may be pumped by a pump 229 from the pit 227 (e.g., or other source) via a line 232 to a port in the swivel 219 to a passage (e.g., or passages) in the drill string 212 and out of ports located on the drill bit 251 (see, e.g., a directional arrow 208). As the drilling fluid 226 exits the drill string 212 via ports in the drill bit 251, it then circulates upwardly through an annular region between an outer surface(s) of the drill string 212 and surrounding wall(s) (e.g., open borehole, casing, etc.), as indicated by directional arrows 209. In such a manner, the drilling fluid 226 lubricates the drill bit 251 and carries heat energy (e.g., frictional or other energy) and formation cuttings to the surface where the drilling fluid 226 (e.g., and cuttings) may be returned to the pit 227, for example, for recirculation (e.g., with processing to remove cuttings, etc.).

The drilling fluid 226 pumped by the pump 229 into the drill string 212 may, after exiting the drill string 212, form a mudcake that lines the wellbore which, among other functions, may reduce friction between the drill string 212 and surrounding wall(s) (e.g., borehole, casing, etc.). A reduction in friction may facilitate advancing or retracting the drill string 212. During a drilling operation, the entire drill string 212 may be pulled from a wellbore and optionally replaced, for example, with a new or sharpened drill bit, a smaller diameter drill string, etc. The act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 251 of the drill string 212 at a bottom of a wellbore, pumping of the drilling fluid 226 commences to lubricate the drill bit 251 for purposes of drilling to enlarge the wellbore. As mentioned, the drilling fluid 226 is pumped by pump 229 into a passage of the drill string 212 and, upon filling of the passage, the drilling fluid 226 may be used as a transmission medium to transmit energy, for example, energy that may encode information as in mud-pulse telemetry.

As an example, mud-pulse telemetry equipment may include a downhole device configured to effect changes in pressure in the drilling fluid 226 to create an acoustic wave or waves upon which information may modulated. In such an example, information from downhole equipment (e.g., one or more modules of the drill string 212) may be transmitted uphole to an uphole device 234, which may relay such information to other equipment 236 for processing, control, etc.

As an example, the drill string 212 may be fitted with telemetry equipment 240 that includes a rotatable drive shaft, a turbine impeller mechanically coupled to the drive shaft such that the drilling fluid 226 can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the drilling fluid 226, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the drilling fluid 226. In the example of FIG. 2, the uphole device 234 may include circuitry to sense pressure pulses generated by telemetry equipment 240 and, for example, communicate sensed pressure pulses or information derived therefrom to the equipment 236 for process, control, etc.

The bottom hole assembly 250 of the illustrated embodiment includes a logging-while-drilling (LWD) module 252, a measuring-while-drilling (MWD) module 253, an optional module 254, a roto-steerable system and motor 255, and the drill bit 251.

The LWD module 252 may be housed in a suitable type of drill collar and can contain one or a plurality of selected types of logging tools. It will also be understood that more than one LWD and/or MWD module can be employed, for example, as represented at by the module 254 of the drill string 212. Where the position of an LWD module is mentioned, as an example, it may refer to a module at the position of the LWD module 252, the module 254, etc. An LWD module can include capabilities for measuring, processing, and storing information, as well as for communicating with the surface equipment. In the illustrated embodiment, the LWD module 252 may include a seismic measuring device.

The MWD module 253 may be housed in a suitable type of drill collar and can contain one or more devices for measuring characteristics of the drill string 212 and drill bit 251. As an example, the MWD tool 253 may include equipment for generating electrical power, for example, to power various components of the drill string 212. As an example, the MWD tool 253 may include the telemetry equipment 240, for example, where the turbine impeller can generate power by flow of the drilling fluid 226; it being understood that other power and/or battery systems may be employed for purposes of powering various components. As an example, the MWD module 253 may include one or more of the following types of measuring devices: a weight-on-bit measuring device, a torque measuring device, a vibration measuring device, a shock measuring device, a stick slip measuring device, a direction measuring device, and an inclination measuring device.

Figure 3:
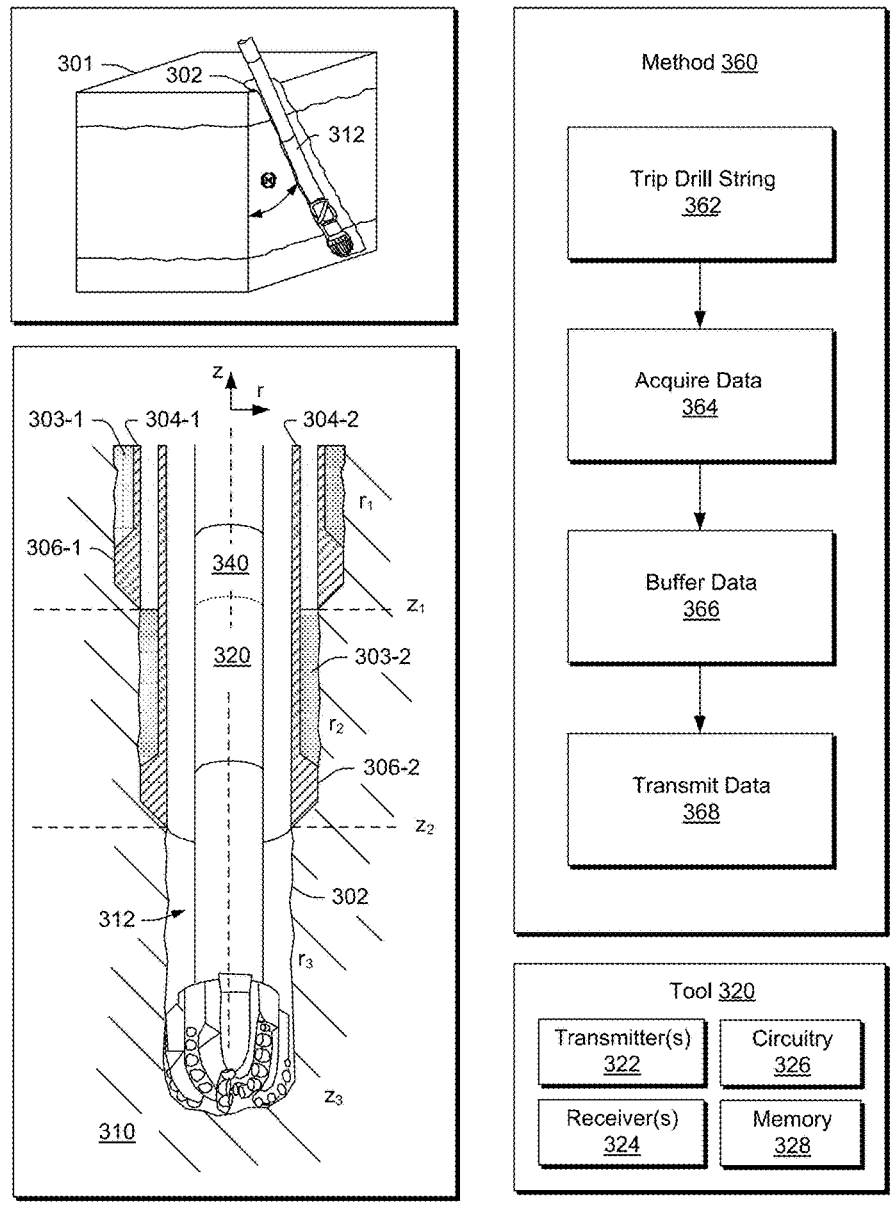
FIG. 3 illustrates examples of equipment with respect to a geologic environment and an example of a method.

FIG. 3 illustrates an example of a system 310 that includes a drill string 312 with a tool (or module) 320 and telemetry equipment 340 (e.g., which may be part of the tool 320 or another tool) and an example of a method 360 that may be implemented using the system 310. In the example of FIG. 3, the system 310 is illustrated with respect to a wellbore 302 (e.g., a borehole) in a portion of a subterranean formation 301 (e.g., a sedimentary basin). The wellbore 302 may be defined in part by an angle ($\Theta$); noting that while the wellbore 302 is shown as being deviated, it may be vertical (e.g., or include one or more vertical sections along with one or more deviated sections, which may be, for example, lateral, horizontal, etc.).

As shown in an enlarged view with respect to an r, z coordinate system (e.g., a cylindrical coordinate system), a portion of the wellbore 302 includes casings 304-1 and 304-2 having casing shoes 306-1 and 306-2. As shown, cement annuli 303-1 and 303-2 are disposed between the wellbore 302 and the casings 304-1 and 304-2. Cement such as the cement annuli 303-1 and 303-2 can support and protect casings such as the casings 304-1 and 304-2 and when cement is disposed throughout various portions of a wellbore such as the wellbore 302, cement can help achieve zonal isolation.

In the example of FIG. 3, the wellbore 302 has been drilled in sections or segments beginning with a large diameter section (see, e.g., $r_1$) followed by an intermediate diameter section (see, e.g., $r_2$) and a smaller diameter section (see, e.g., $r_3$). As an example, a large diameter section may be a surface casing section, which may be three or more feet in diameter and extend down several hundred feet to several thousand feet. A surface casing section may aim to prevent washout of loose unconsolidated formations. As to an intermediate casing section, it may aim to isolate and protect high pressure zones, guard against lost circulation zones, etc. As an example, intermediate casing may be set at about X thousand feet and extend lower with one or more intermediate casing portions of decreasing diameter (e.g., in a range from about thirteen to about five inches in diameter). A so-called production casing section may extend below an intermediate casing section and, upon completion, be the longest running section within a wellbore (e.g., a production casing section may be thousands of feet in length). As an example, production casing may be located in a target zone where the casing is perforated for flow of fluid into a lumen of the casing.

Referring again to the tool 320 of FIG. 3, it may carry one or more transmitters 322 and one or more receivers 324. In the example of FIG. 3, the tool 320 includes circuitry 326 and a memory device 328 with memory for storage of data (e.g., information), for example, signals sensed by one or more receivers 324 and processed by the circuitry 326 of the tool 320. As an example, the tool 320 may buffer data to the memory device 328. As an example, data buffered in the memory device 328 may be read from the memory device 328 and transmitted to a remote device using a telemetry technique (e.g., wired, wireless, etc.).

Figure 4:
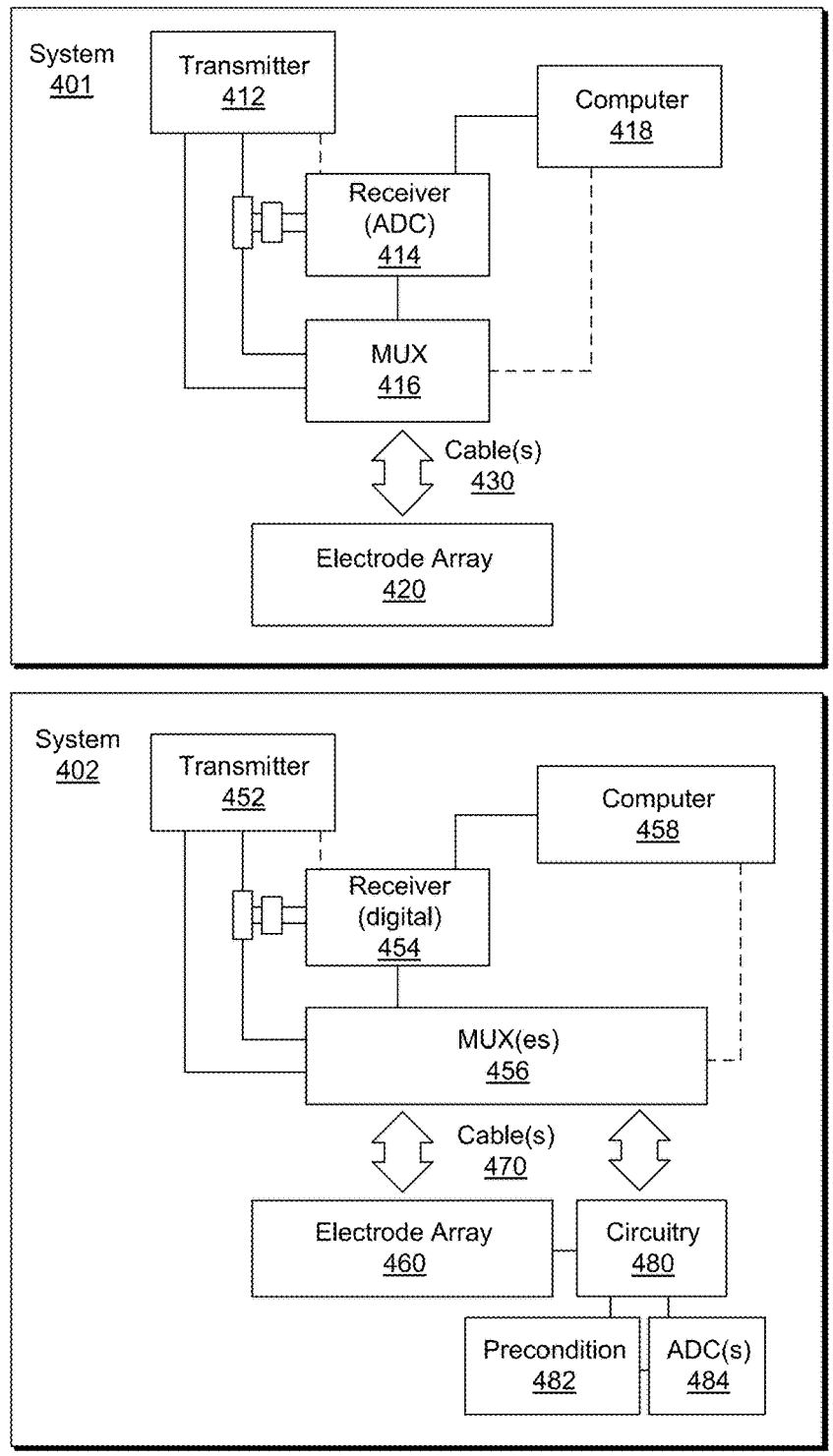
FIG. 4 illustrates examples of systems.

FIG. 4 shows an example of a system 401 and an example of a system 402. The systems 401 and 402 may be configured to perform electrical resistivity tomography (ERT). As an example, the system 401 and the system 402 may be configured to perform surface to borehole and/or borehole to surface ERT. For example, an electrode array may be implemented to transmit energy and/or to sense energy. As an example, a system may be configured for cross-well ERT, for example, where equipment may be positioned in multiple wells.

As shown, the system 401 includes a transmitter 412, a receiver 414, a multiplexer (MUX) 416, a computer 418, an electrode array 420 and one or more cables 430. The system 401 may transmit energy from the transmitter 412 to the multiplexer 416 and to the electrode array 420 via the one or more cables 430. The multiplexer 416 may be configured to switch connections from transmission to reception, for example, to allow the receiver 414 to receive analog signals associated with electrodes of the electrode array 420. As shown, the receiver 414 includes analog to digital conversion circuitry (e.g., an ADC or ADCs) that can convert received analog signals to digital signals. Such digital signals may be transmitted to the computer 418 for analysis. For example, the receiver 414 may include a digital interface and the computer 418 may include a digital interface (e.g., consider a RS232 interface). In the system 401, the analog signals transmitted via the one or more cables 430 may degrade and/or collect noise. Such factors may impact the quality of analog to digital conversion and, for example, analysis of the converted signals.

As shown, the system 402 includes a transmitter 452, a receiver 454, one or more multiplexers (MUXes) 456, a computer 458, an electrode array 460, one or more cables 470 and circuitry 480, which can include preconditioning circuitry 482 and analog to digital conversion circuitry 484. The system 402 may transmit energy from the transmitter 452 to one or more of the one or more multiplexers 456 and to the electrode array 460 via the one or more cables 470. At least one of the one or more multiplexers 456 may be configured to switch connections for transmissions to particular electrodes. At least one of the one or more multiplexers 456 may be configured to switch connections for reception of digital signals, for example, to allow the receiver 454 to receive digital signals converted from analog signals associated with various electrodes of the electrode array 460. As shown, the receiver 454 may be a digital receiver that can receive and transmit digital signals. For example, digital signals may be received from at least one of the one or more multiplexers 456 and may be transmitted to the computer 458 for analysis. For example, the receiver 454 may include a digital interface and the computer 458 may include a digital interface (e.g., consider a RS232 interface, USB interface, network interface, etc.). As an example, the computer 458 may include reception circuitry such as that of the receiver 454. In such an example, at least one of the one or more multiplexers may transmit digital signals to the computer 458. In the system 402, the digital signals transmitted via at least one of the one or more cables 470 may carry information that is relatively immune to degradation and/or collection of noise (e.g., in comparison to analog signals of the system 401).

The system 402 is an example as circuitry may be reconfigured to position, for example, various circuitry, components, etc. at one end of a cable or at another end of a cable. For example, a multiplexer or multiplexers may be provided as downhole equipment and/or as surface equipment. As an example, consider an energy transmission multiplexer being surface equipment and a digital data multiplexer as being downhole equipment. As an example, the circuitry 480 may be operatively coupled to a wire or wires that are dedicated for transmission of digital signals. In such an example, the digital signals may be transmitted to the receiver 454 and/or the computer 458, optionally without passing through an intermediate multiplexer. For example, the circuitry 480 may transmit digital signals with information as to corresponding electrodes of the electrode array 460. As an example, the computer 458 may control timing of the multiplexer as to transmission of energy in a manner that timing information is used to categorize digital signals (e.g., as acquired via downhole equipment and/or surface equipment). As an example, a wire or wires may be utilized to transmit energy and then to transmit digital signals of the circuitry 480. In such an example, at least one of the multiplexers of the one or more multiplexers 456 may be switched to transmit energy to particular electrodes of the electrode array 460 and then switched to receive digital signals generated by the circuitry 480. In such an example, the circuitry 480 or other downhole circuitry may include one or more switches, signal injectors, etc. to provide for electronically coupling the circuitry 480 to one or more wires of the one or more cables 470.

As mentioned, configuration of a system may depend on a type of survey being performed, which may be, for example, a surface to borehole, a borehole to surface or a cross-well. As an example, a system may include surface equipment for purposes of surface to borehole and/or borehole to surface surveys (see, e.g., FIG. 8).

As an example, the system 402 may include one or more isolation amplifiers, one or more current monitoring circuits, etc. As an example, a system such as the system 401 of FIG. 4 may be adapted using various components of the system 402 of FIG. 4. For example, downhole equipment of the system 402 may be operatively coupled to surface equipment of the system 401 where, for example, the receive 414 and/or the computer 418 is adapted and/or replaced with circuitry to receive digital signals. As an example, a system may include one or more of the one or more cables 430 of the system 401 and/or one or more of the one or more cables of the system 402. As an example, the system 402 may be implemented with appropriate features for operation in multiple boreholes. For example, various components may be replicated, various components may be replicated and/or interlinked, etc.

As an example, the computer 418 and/or the computer 458 may include a processor and memory where processor-executable instructions may be stored in the memory and executed to instruct the computer 418 or the computer 458 to perform an analysis or analyses based at least in part on received digital signals (e.g., digital data). Such data may be ERT data and a computer may include instructions to perform an inversion, as may be part of a tomographic technique.

As an example, ERT for subsurface data acquisition can employ subsurface electrode arrays to measure the resistivity distribution in soil and rock. Electrode arrays can include electric dipoles arranged vertically on an emplacement string. As an example, electrode array shafts or strings may be emplaced in one or more boreholes (or hydraulic push holes) with some electrode dipoles acting as current-source electric dipoles and other dipoles acting as potential-measuring dipoles. As an example, electrical resistivity data from a current-source and potential-measuring dipoles in the electrode arrays may be acquired and processed, for example, to produce two- or three-dimensional subsurface images. As an example, a system may be configured for unattended data collection and analysis, for example, to help provide cost-effective, long-term monitoring.

As an example, current may be conducted through a formation and the potential difference measured. Such a process may be repeated for various positional combinations of source and receiver electrode dipoles to produce data (e.g., for multidimensional images).

As an example, a method can include calculating the distribution of resistivity in the vicinity of boreholes based on measured transfer resistances. Such a process may handle non-linearity due to current paths being dependent on the resistivity distribution. An ERT inversion process can involve solving, for example, forward and inverse linearity problems. A solution to a forward linearity problem may implement a numerical technique (e.g., finite difference, finite element method, etc.) to compute potential electrical response in a subsurface environment due to current source. A reverse linearity problem may be solved by an iterative inversion routine to approximate resistivity distribution. A product of such a process may be an image (e.g., a tomograph) that shows distribution of resistivity as associated with electrode arrays. As an example, by interconnecting a network of boreholes with vertical electrode arrays, and measuring electrical resistivity between vertically spaced electrodes in the network, a three-dimensional representation of the area being investigated may be developed. Three-dimensional resistivity images obtained before, during, and after a field operation process may be used to determine one or more aspects of the field operation process. As an example, a pattern of resistance changes may be correlated with properties of interest in a field operation process.

An article entitled "Electrical resistance tomography: theory and practice" by Daily et al., Near surface geophysics (ed. Dwain K. Butler), Society Of Exploration Geophysicists, 2005. p. 525-550, is incorporated by reference herein.

FIG. 5 shows an example of a method 510 and an example of a system 570. As shown, the method 510 includes a sense block 514 for sensing potential as analog signals in a bore in a geologic environment, a process block 518 for processing the analog signals to generate digital signals, a transmission block 522 for transmitting at least a portion of the digital signals and an analysis block 526 for analyzing at least a portion of the transmitted digital signals (e.g., as received by a computing system). As an example, the method 510 may be implemented with respect to one or more bores in a geologic environment.

In the example of FIG. 5, the system 570 includes one or more information storage devices 572, one or more computers 574, one or more networks 580 and one or more modules 590. As to the one or more computers 574, each computer may include one or more processors (e.g., or processing cores) 576 and memory 578 for storing instructions (e.g., modules), for example, executable by at least one of the one or more processors. As an example, a computer may include one or more network interfaces (e.g., wired or wireless), one or more graphics cards, a display interface (e.g., wired or wireless), etc.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

Figure 6:
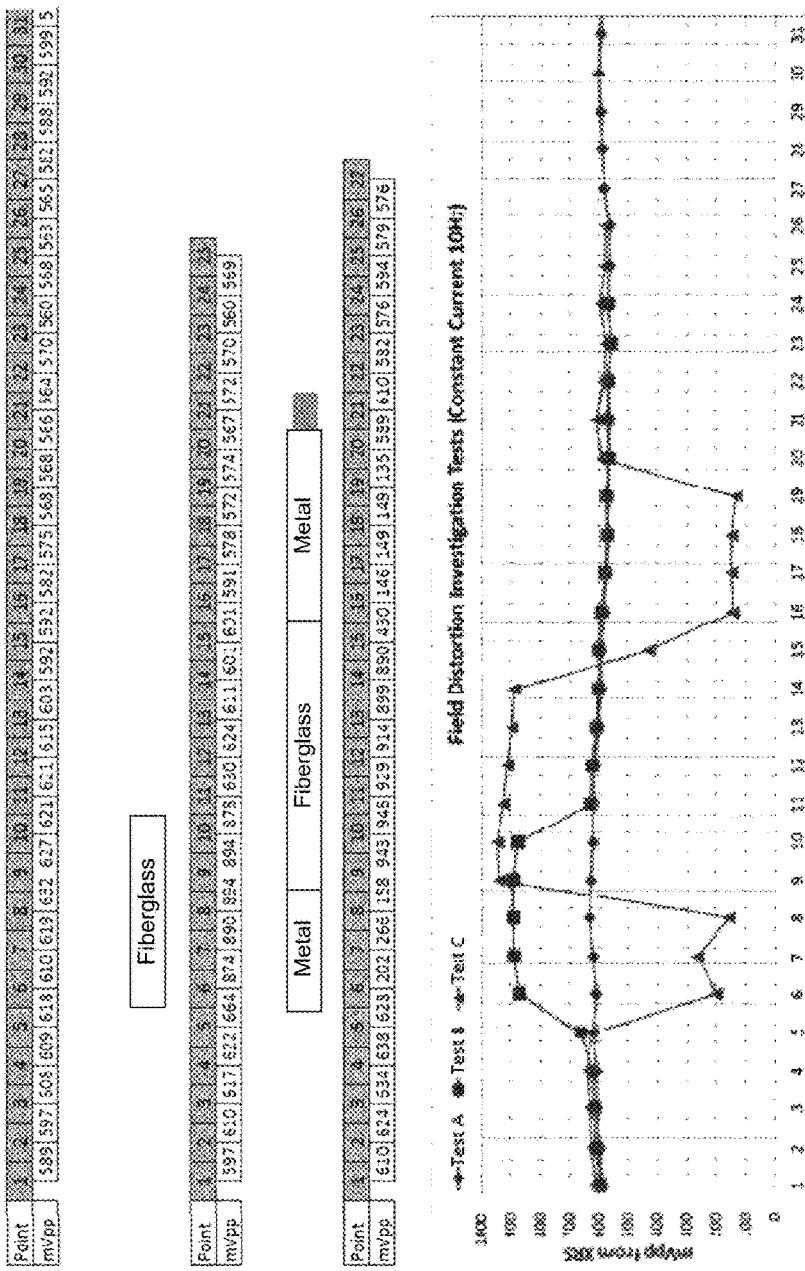
FIG. 6 illustrates example data.

FIG. 6 shows example trial results where an electric field is produced inside a cylindrical tank filled with water, by applying a potential difference between two source electrodes placed at the ends of the tank. A baseline measurement (Test A) was performed by recording the electric field as a function of position along the tank. Another example trial (Test B) involved use of an insulating material tube (e.g., fiberglass) that was inserted in the conducting medium and the measurement repeated. As indicated, at the position of the fiberglass, the field strength increases as the presence of the resistor "compresses" the current lines in the surrounding medium, thus yielding an increase in the field. Yet another example trial (Test C) demonstrated how the electric field vanishes in the vicinity of the metal conductor, namely an electronic housing of the tool.

As demonstrated by the example trial results, as the source signal changes, the field observed in the vicinity of the insulated fiberglass changes accordingly and is further amplified if the surrounding medium is increasingly resistive. In the vicinity of the metal conductor, the field vanishes rapidly and therefore, changes in the strength of the source are more difficult to discern.

As an example, to measure field in an axial direction (e.g., of a bore), an electrode array can be mounted in an insulating holder. As an example, a tool can act to minimize distortion by effectively mounting an electrode array in an insulating holder. As an example, alternatively or additionally, a multi-conductor cable with takeout electrodes can be used at a bottom of a logging tool or electrodes can be mounted on a logging tool. In such an example, a tool array can be outfitted with an insulating sleeve (e.g., from top to bottom) and, for example, an insulating bridle can optionally be used to act to minimize the effect of a metal wireline cable.

As an example, a perturbing effect of metallic sections may occur when the size of the electrodes is comparable to the distance between them. As the distance increases, the difference of potential due to the (external) field of interest to the measurement can dominate over the distortion produced by the electrodes. In a logging tool, electrode separation may be of the order of a few meters; thus, as an example, relatively small electrode sensors may be implemented in an effort to minimize this effect. Alternatively, as an example, compensation for borehole fluid and tool properties may be achieved by applying a calibration to a tool, which may be performed a facility and at a wellsite (e.g., through dedicated test fixtures). As an example, a tool may include small size electrodes, designed to maximize physical contact and thus decrease contact resistance with a formation.

Figure 7:
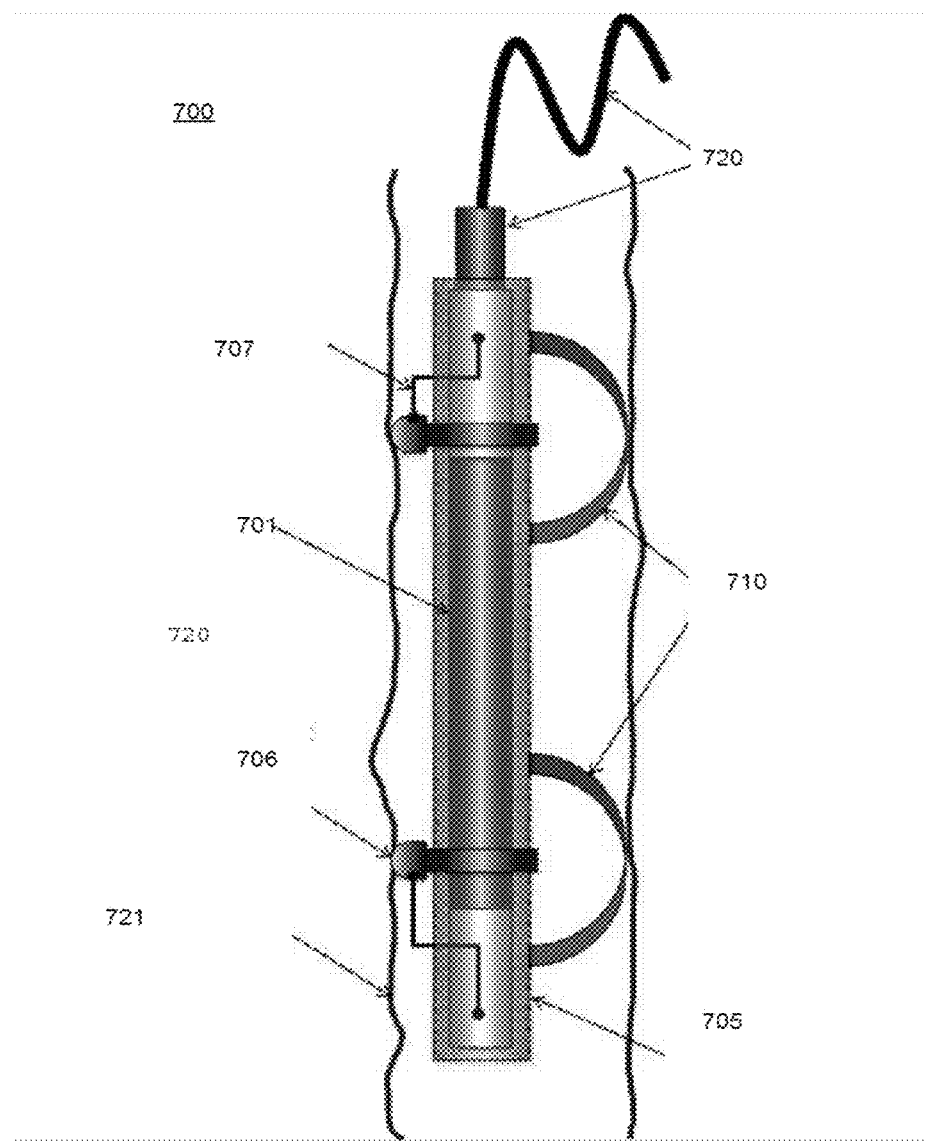
FIG. 7 illustrates an example of a device.

FIG. 7 shows an example of a device 700 that includes external electrodes 706, internal electronics 701, an electronics housing 701 for electronics and optionally other sensors, one or more eccentralizers 710 (e.g., non-conductive, optionally non-metallic, etc.), an insulating sleeve 705 (e.g., fiberglass, etc.), an insulating head 720 and optionally a bridle 720. A connection 707 allows electrical contact between electronics from the electronic housing and the external electrodes. As shown, the device 700 may be a downhole device such as a downhole tool that can be implemented for ERT. As shown, the eccentralizers can bias the external electrodes against a borehole wall 721 of a borehole in a formation 720 to help form contacts between the electrodes and the formation. As an example, eccentralizers may be along a line, spaced at different azimuthal angles, etc. For example, eccentralizers may be form a triangle with electrodes where eccentralizers are spaced at about 45 degrees apart to bias electrodes against a wall. As an example, a correspondence may exist for eccentralizers and electrodes (e.g., one eccentralizer per electrode, a pair of eccentralizers per electrode, etc.). As an example, a housing may have a length that may be subject to tilting in a borehole. In such an example, eccentralizers may act to reduce tilting and to bias electrodes against a bore wall. The device 700 is an example that may be a tool section that includes one dipole/two electrodes.

As an example, a data logger system can be implemented for making multiple electric field measurements where such measurements may be, for example, based at least in part on differentiation of potentials acquired at electrode positions of a downhole tool of the data logger system where the electrode positions may be contiguous positions (see, e.g., the electrodes of the device 700). As an example, a tool may be configured with an aim to maximize contact between its electrodes and a borehole wall of a formation. For example, a tool can include one or more vertical insulating eccentralizers that act to push the tool to be in contact with the formation (see, e.g., the device 700). As an example, an eccentralizer may exert a biasing force (e.g., or biasing forces) that biases one or more electrodes toward a borehole wall of a formation.

As an example, an electrode holder, which may be a logging tool, a separate rod hanging below or above a tool, or a wireline cable, can be electrically insulated from a medium or media in a borehole. For example, a logging tool can be covered by an electrically insulating sleeve (e.g., along a length, optionally from top to bottom) that acts to reduce risk of contact (e.g., to prevent contact) between a borehole medium (e.g., or borehole media) and one or more metallic sections of the tool (see, e.g., the device 700 and its insulating sleeve). As an example, an insulating bridal may be used at a head of a tool array (see, e.g., the device 700 and its insulating bridle).

As an example, electrode size and material can be selected and configured in a manner that acts to minimize streaming potential and self-potential at interfaces between an electrode and borehole medium (e.g., or borehole media).

As an example, a system can include an analog signal generator that can be used to feed analog signals into one or more tools, for example, via one or more insulating cables that can connect to electronic housings through insulating sleeves. As an example, analog signals can be preconditioned and digitized in electronics downhole (e.g., via electronics of a downhole tool). In such an example, data may be submitted digitally to one or more other pieces of equipment (e.g., consider surface equipment) via one or more wireline cables. As an example, a downhole tool may be a tool that is configured for downhole positioning and use. Thus, a downhole tool may be a tool that is not downhole. The phrase "downhole" with respect to equipment may be appreciated in context to refer to equipment that is configured for downhole positioning and use and/or such equipment that is positioned downhole (e.g., in a borehole, etc.). As an example, equipment may be implemented as part of a data acquisition system for surface to borehole and/or borehole to surface services. For example, consider surface to borehole EM services and vice versa.

As an example, a method may include performing resistivity-based image surveys for monitoring fluid distribution and movement. As an example, electromagnetic imaging may be implemented via resistivity logging. As an example, a method may include monitoring fluid distribution and movement on a reservoir scale via EM imaging (e.g., for optimizing sweep efficiency, identifying bypassed reserves, etc.). As an example, logging may be performed via surface to borehole and/or borehole to surface. As an example, a method may include implementing a cross-well technique that may include positioning a transmitter tool in one well and a receiver tool in another well. In such an example, EM imaging may be conducted between the two wells (e.g., located up to about 1 km apart, depending on the well completions and the formation and resistivity contrasts).

As an example, a method may include receiving electrical attributes for a region of interest. Examples of electrical attributes may include resistivity, conductivity, or other electrical parameters. The electrical attributes may be obtained from raw electromagnetic (EM) data (e.g., electric field data and/or magnetic field data) acquired during an electromagnetic survey. Raw EM data may be collected by recording electromagnetic fields that pass beneath the Earth's subsurface. While the raw EM data may be acquired using CSEM survey techniques, other electromagnetic survey techniques may be used as well. For instance, magnetotelluric (MT) surveying or DC electrical techniques, such as those regarding resistivity or magnetometric resistivity, may be used to determine electrical attributes for the region of interest. Through CSEM inversion or a similar type of electromagnetic inversion, the raw EM data may be transformed into a data set that shows electrical attributes such as resistivity, conductivity, or other EM properties of the mediums in the subsurface. This inversion may produce an EM data set that includes separate vertical and horizontal resistivity attributes for the region of interest. If isotropic media is assumed, either the horizontal or vertical resistivity components may be used as the basis for a specific electrical attribute. In one implementation, the electrical attributes may be obtained through a controlled-source electromagnetic anisotropic inversion of electromagnetic survey data for the region of interest. As an example, EM data and seismic data may be analyzed.

Figure 8:
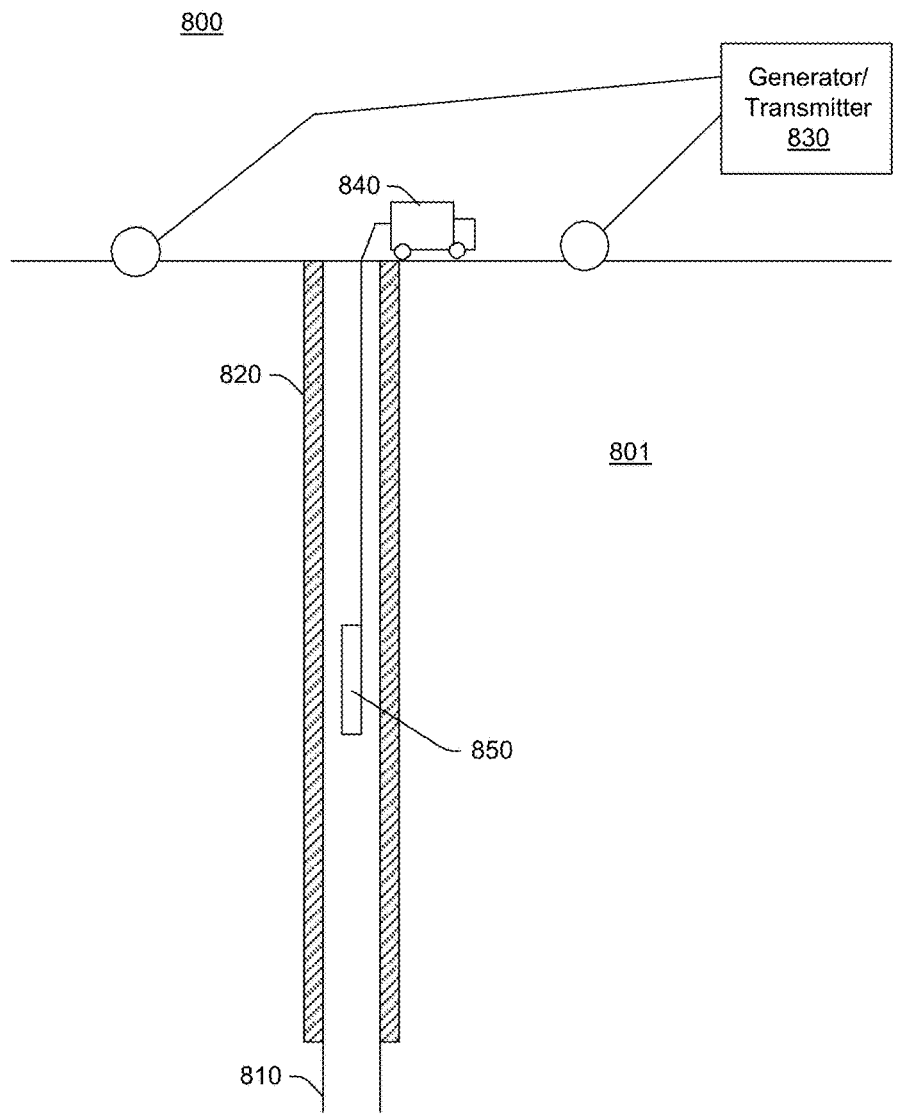
FIG. 8 illustrate an example of a system.

FIG. 8 shows a diagram of a surface to borehole system 800. As shown, in a geologic environment 801, a borehole 810 includes a cased portion 820 where a generator/transmitter 830 is provided as surface equipment along with a receiver vehicle 840 that is operatively coupled to a tool 850, which may include one or more features of the device 700 of FIG. 7. The generator/transmitter 830 can include equipment for creating a source loop where energy of the source loop may be sensed by electrodes of the tool 850.

As an example, a surface-to-borehole (STB) configuration can include surface-based, loop transmitters, which may be more powerful than borehole transmitters to extend the range of the system (e.g., to about 1 km or more through moderately conductive ground). As shown in FIG. 8, the surface-to-borehole system 800 can include a transmitter loop situated at the surface and a receiver probe tool 850 within the borehole 810 that may be located inside the loop or offset from it. As an example, for a STB configuration, data may be collected while both source and receiver are stationary. As an example, a signal may be applied to the transmitter coil by a function generator connected to a power amplifier (e.g., consider a supply up to about 15 A of current to a 100 square meter multi-turn loop, which may yield transmitter moments). As an example, a complete sounding may be made in a band from about 1 Hz to about 1 kHz.

As illustrated in the example of FIG. 8, an STB system may be implemented to collect in a cased well; though steel-casing can attenuate the signals at higher frequencies. Such attenuation and related phase shift due to steel casing is akin to an analog filter and effects may be removed. As an example, downhole circuitry may include features for removal of such effects, optionally prior to digitization.

While FIG. 8 shows a STB, a tool may be configured for implementation in a borehole to surface arrangement (BTS). For example, consider a tool being configured to transmit while receivers may be implemented on the surface.

As an example, a tool may be configured for STB where a transmitter transmits energy at a surface and where the tool receives energy as analog signals that are converted to digital signals prior to transmission of the digital signals (or information based on at least a portion of such digital signals) uphole (e.g., to surface equipment).

Figure 9:
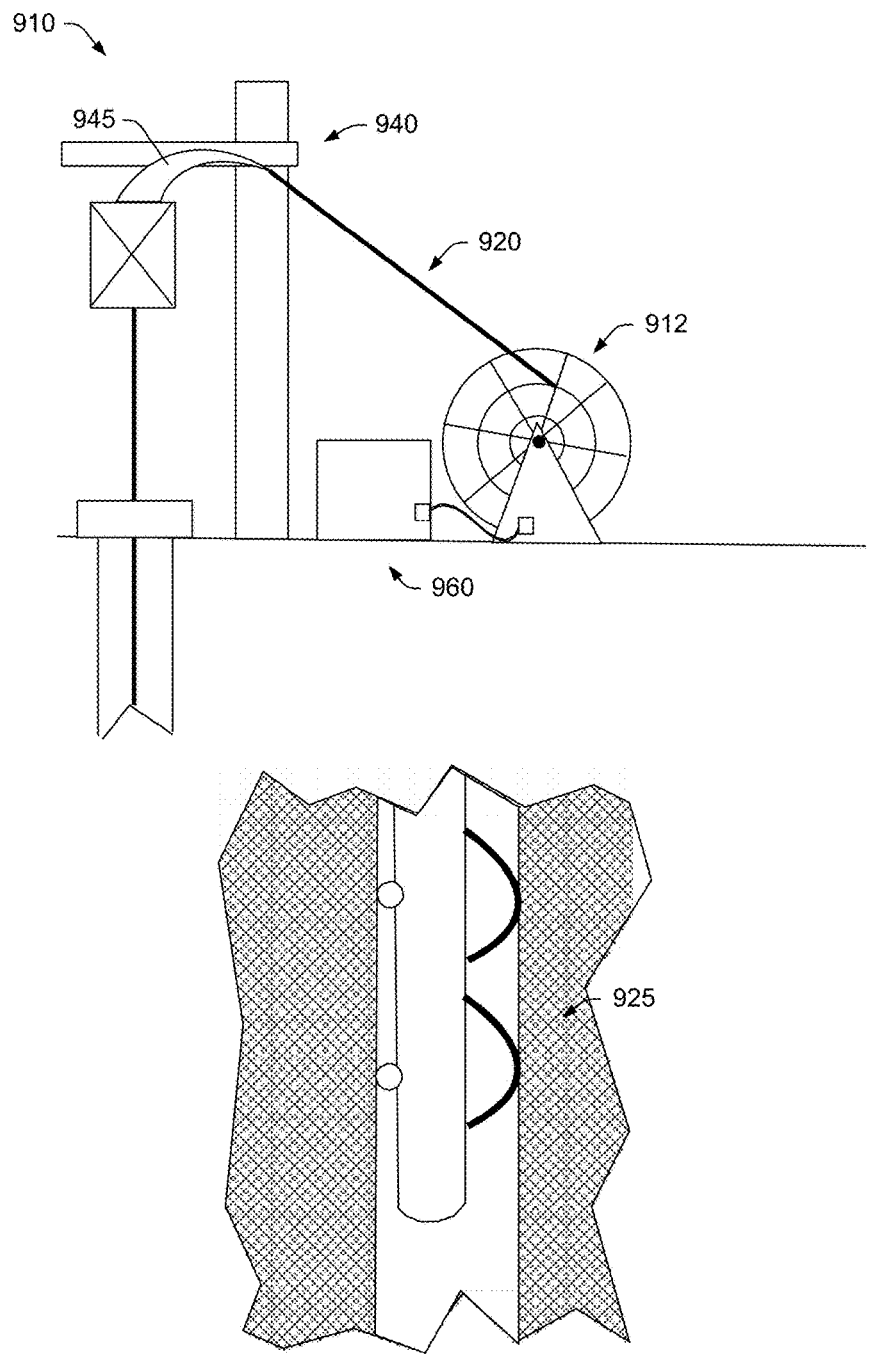
FIG. 9 illustrates an example of a geologic environment, an example of a system and an example of a tool.

FIG. 9 shows an example of a geologic environment 900 and a system 910 positioned with respect to the geologic environment 900. As shown, the geologic environment 900 may include at least one bore. In the example of FIG. 9, the system 910 may include a reel for deploying a wireline that is operatively coupled to a tool 925 that may include one or more features of the device 700 of FIG. 7. As an example, the system 910 may include a rig 940 that carries a wireline mechanism 945 that may function to transition wireline from a reel to a downward direction for positioning in a bore.

As shown in the example of FIG. 9, a unit 960 may include circuitry that is electrically coupled (e.g., via wire or wirelessly) to the tool 925, for example, via a deployment mechanism. As an example, the wireline 920 may include or carry one or more wires and/or other communication equipment (e.g., fiber optics, rely circuitry, wireless circuitry, etc.) that are operatively coupled to the tool 925. As an example, the unit 960 may process information acquired by the tool 925. As an example, the unit 960 may include one or more controllers for controlling, for example, operation of one or more components of the system 910. As an example, the unit 960 may include circuitry to control depth/distance of deployment of the tool 925. As an example, the unit 960 may include circuitry, modules, etc.

As an example, a device can include a housing; external electrodes; circuitry disposed in the housing where the circuitry converts analog signals sensed by the external electrodes to digital signals. In such an example, the device can include an insulating sheath that insulates at least a portion of the housing. As an example, a device can include at least one eccentralizer positioned with respect to at least one external electrodes to bias the at least one external electrode against a surface. In such an example, the at least one eccentralizer may include a non-metallic material. As an example, an eccentralizer may be made of or include a non-conductive material. As an example, a device can include two external electrodes and two eccentralizers. As an example, a device includes external electrodes that are external to an insulating sheath and electronically coupled to circuitry. As an example, a device can include a bridle.

As an example, a system can include a surface source loop; a transmitter that transmits electromagnetic energy to the surface source loop; surface equipment that controls the transmitter and that analyzes received digital signals associated with electromagnetic energy transmitted by the surface source loop; a tool that comprises external electrodes for sensing at least a portion of electromagnetic energy transmitted by the surface source loop and circuitry that converts analog signals sensed by the external electrodes to digital signals; and a cable that operatively couples the tool to the surface equipment for transmission of the digital signals to the surface equipment for analysis. In such a system, the tool may include a housing and an insulating sheath that insulates at least a portion of the housing. As an example, a tool can include at least one eccentralizer positioned with respect to at least one of the external electrodes to bias the at least one external electrode against a surface of a borehole. Such an eccentralizer may include a non-metallic material or other non-conductive material. As an example, a tool can include two external electrodes and two eccentralizers. As an example, external electrodes may be external to an insulating sheath and electronically coupled to circuitry. As an example, circuitry may include preconditioning circuitry that preconditions analog signals prior to digitization of the analog signals.

As an example, a method can include sensing analog signals in a borehole in a geologic environment, the analog signals being associated with electromagnetic energy transmitted via a surface loop; converting the analog signals to digital signals; and transmitting the digital signals via a cable to surface equipment. Such a method may further include analyzing the digital signals using the surface equipment. For example, analyzing can include performing an inversion associated with electrical resistivity tomography to generate a tomograph of at least a portion of the geologic environment.

As an example, one or more methods described herein may include associated computer-readable storage media (CRM) blocks. Such blocks can include instructions suitable for execution by one or more processors (or cores) to instruct a computing device or system to perform one or more actions.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 10:
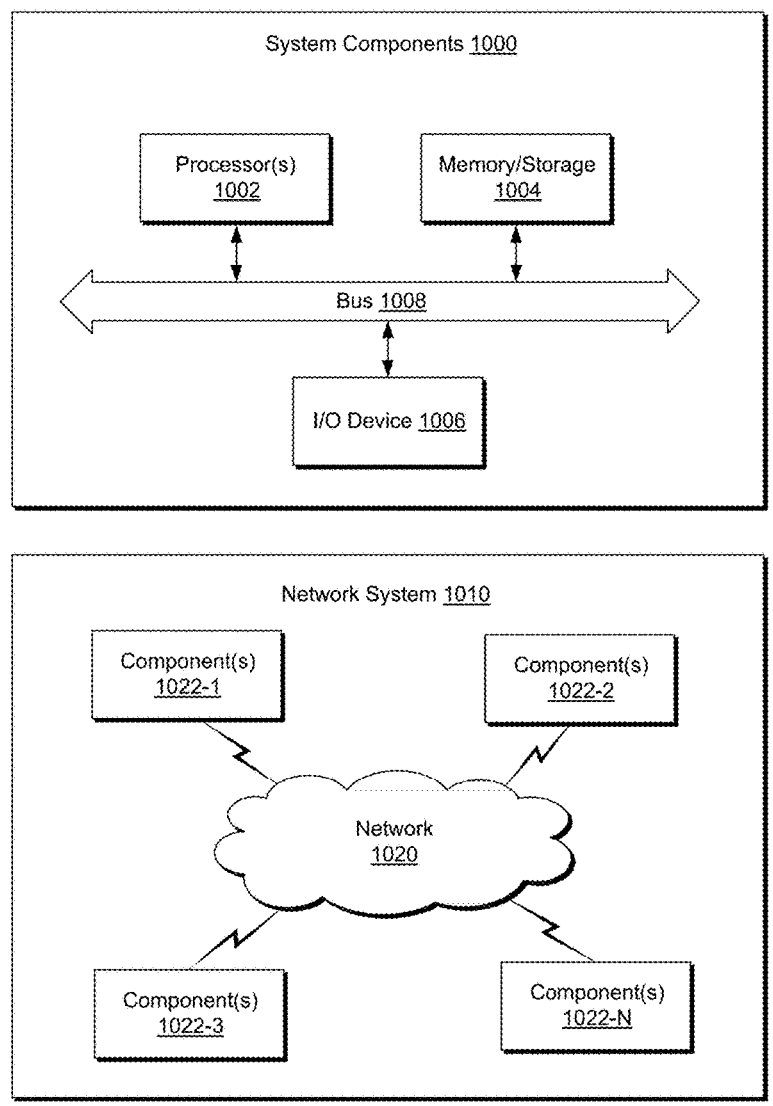
FIG. 10 illustrates example components of a system and a networked system.

FIG. 10 shows components of a computing system 1000 and a networked system 1010. The system 1000 includes one or more processors 1002, memory and/or storage components 1004, one or more input and/or output devices 1006 and a bus 1008. According to an embodiment, instructions may be stored in one or more computer-readable media (e.g., memory/storage components 1004). Such instructions may be read by one or more processors (e.g., the processor(s) 1002) via a communication bus (e.g., the bus 1008), which may be wired or wireless. The one or more processors may execute such instructions to implement (wholly or in part) one or more attributes (e.g., as part of a method). A user may view output from and interact with a process via an I/O device (e.g., the device 1006). According to an embodiment, a computer-readable medium may be a storage component such as a physical memory storage device, for example, a chip, a chip on a package, a memory card, etc.

According to an embodiment, components may be distributed, such as in the network system 1010. The network system 1210 includes components 1022-1, 1022-2, 1022-3, . . . 1022-N. For example, the components 1022-1 may include the processor(s) 1202 while the component(s) 1022-3 may include memory accessible by the processor(s) 1002. Further, the component(s) 1002-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A system comprising:
a surface source loop;
a transmitter that transmits electromagnetic energy to the surface source loop;
surface equipment that controls the transmitter and that analyzes received digital signals associated with electromagnetic energy transmitted by the surface source loop;
a tool that comprises at least two external electrodes for sensing at least a portion of electromagnetic energy transmitted by the surface source loop, two eccentralizers positioned to form a triangle with respect to at least one of the external electrodes to bias the at least one external electrode against a surface of a borehole, and circuitry that converts analog signals sensed by the external two electrodes to digital signals, wherein an angle between the two eccentralizers is approximately 45 degrees with respect to the at least one of the external electrodes; and a cable that operatively couples the tool to the surface equipment for transmission of the digital signals to the surface equipment for analysis.

2. The system of claim 1 wherein the tool comprises a housing and an insulating sheath that insulates at least a portion of the housing.

3. The system of claim 2 wherein the external electrodes are external to the insulating sheath and electronically coupled to the circuitry.

4. The system of claim 2 wherein the tool comprises a bridle.

5. The system of claim 2 wherein the circuitry comprises preconditioning circuitry that preconditions analog signals prior to digitization of the analog signals.

6. The system of claim 1 wherein the tool comprises two external electrodes.

7. The system of claim 1, wherein the two eccentralizers are positioned to form a second triangle with respect to at least another one of the external electrodes to bias the at least another one external electrode against the surface of the borehole.

8. The system of claim 7, wherein an angle between the two eccentralizers is approximately 45 degrees with respect to the at least another one of the external electrodes.

* * * * *